United States Patent
Schwartz

[19]

[11] Patent Number: 5,940,869
[45] Date of Patent: Aug. 17, 1999

[54] SYSTEM AND METHOD FOR PROVIDING SHARED MEMORY USING SHARED VIRTUAL SEGMENT IDENTIFICATION IN A COMPUTER SYSTEM

[75] Inventor: William H. Schwartz, Delray Beach, Fla.

[73] Assignee: International Business Machines Corporation, Armonk, N.Y.

[21] Appl. No.: 08/472,363

[22] Filed: Jun. 7, 1995

[51] Int. Cl.[6] ............................................. G06F 12/08
[52] U.S. Cl. ....................................................... 711/206
[58] Field of Search ................................. 395/412, 416, 395/417, 419; 711/202, 203, 205, 206

[56] References Cited

U.S. PATENT DOCUMENTS

| | | | |
|---|---|---|---|
| 4,356,549 | 10/1982 | Chuett | 364/200 |
| 4,742,450 | 5/1988 | Duvall et al. | 395/700 |
| 4,758,951 | 7/1988 | Sznyter, III | 395/416 |
| 5,301,288 | 4/1994 | Newman et al. | 395/412 |

*Primary Examiner*—Lucien U. Toplu
*Attorney, Agent, or Firm*—Marilyn S. Dawkins; John G. Graham; Andrew J. Dillon

[57] ABSTRACT

A method and system for allowing multiple tasks to share virtual memory areas, in a memory management system for a computer, uses a data structure which maintains a list of address spaces shared by more than one task. For each entry in this list, a list of slots in virtual address space is maintained in the data structure, where each slot contains indications that said shared memory was mapped into a task. An offset table of directory pages is also maintained, and each entry in this directory points to a directory page for a task. The directory page entries for all of such directory pages points to a page table entry. An entry in each of the offset tables points to the entry in the list of shared address spaces for this set.

8 Claims, 5 Drawing Sheets

SYSTEM AND METHOD FOR PROVIDING SHARED MEMORY USING SHARED VIRTUAL SEGMENT IDENTIFICATION IN A COMPUTER SYSTEM

RELATED CASE

Subject matter described herein is also described in co-pending application Ser. No. 472,364 filed herewith by William H. Schwartz & Suresh Yanamadala, entitled "SYSTEM AND METHOD FOR PROVIDING EFFICIENT SHARED MEMORY IN A VIRTUAL MEMORY SYSTEM."

BACKGROUND OF THE INVENTION

1. Technical Field

The present invention relates to data processing systems. In particular, the invention relates to a system and method of operating a virtual memory system for a computer to provide efficient shared memory.

2. Description of the Related Art

In the above-mentioned related application Ser. No. 472,364 a shared memory system is described which makes use of characteristics of the powerPC and its operating system, and the concepts therein are applicable also to other architectures such as the Intel i386 or i486 as described herein.

Previously, shared memory in a virtual memory management system has been provided by page aliasing. Each virtual mapping of a shared physical page required individual kernel structures and hardware page table entry resources. Such an arrangement amounts to a very large redundant overhead in a system, such as OS/2 and OS/2 for the powerPC (or a workplace operating system), that relies heavily on shared memory. In such a system, any change to the shared memory attributes would require that each mapping be modified individually, resulting in a heavy performance penalty.

Some virtual memory systems provide the feature of a shared memory band that appears at the same address in each address space; in contrast, the system described herein uses the creation of an independent address space that can be attached at any address selectively.

It is noted that the system described herein involves the creation of and sharing of an address space; an address space is like a container for memory objects. Many other shared memory schemes only deal with sharing memory objects. Sharing a memory object allows modifications by one task to be seen by multiple tasks. Sharing an address space allows modifications to the address space, such as creating and destroying of memory objects and changes to the attributes of the memory object, such as protection changes, to be seen by multiple tasks by performing the operation only to the shared address space.

On an Intel i386 architecture, typically the use of shared memory with multiple tasks would result in the directory page in each address space pointing to a page table page that would each contain a page table entry referring to the same physical page; and change to the access of this page, such as changing the access protection, would require all page table entries to be modified. According, an efficient data structure organization to manage page table pages to emulate powerPC virtual segment IDs to provide shared memory, is provided by this invention.

SUMMARY OF THE INVENTION

It is an object of the present invention to provide an improved method of operating a virtual memory management system for a computer.

It is another object of the invention to provide a system and method of allowing multiple tasks in a computer system to share memory space, without duplicating system resources.

These and other objects of the invention are achieved as is now described. A method of providing efficient shared memory in a virtual memory system takes advantage of the inverted page table architecture of the powerPC and the IBM Microkernel virtual memory design.

The shared memory method of the invention solves, the problem of the expense (in system resources) of page aliasing. An independent address space is created such that it can be "attached" to multiple address spaces. Any change to the shared address space is reflected in all attached address spaces with just one operation to the shared address space. Entities in the shared address space require only one set of system resources. Since the same powerPC virtual segment ID is used for all attached address spaces, only one set of powerPC page table entries is needed.

Another feature is attaching shared memory with and without control privileges to provide protection; tasks with privilege can manipulate the address space using the same operations and base addresses as in the non-shared normal address space, and tasks with normal attachment can only reference the memory objects in the overlaid shared address space memory objects can not be created or destroyed. For protection, the shared address space can be attached either with or without privilege to add or subtract entries in the shared map. With control privilege, virtual memory operations such as allocation, change of access protection, and deletion are allowed. Without control privilege, only data read and write access is allowed. Operations which manipulate the address space are refused.

A memory object in an address space requires a kernel control structure to describe its attributes. Attaching a shared memory address space uses a particular type of structure that redirects the description to the shared address space. This structure will declare whether the attachment is control=yes or control=no. Address space manipulation operations check this indicator when deciding whether or not to allow an operation.

A feature of the invention is associating a powerPC virtual segment ID with an independent shared address space, then mapping this single segment ID into multiple tasks to "overlap" the task's address space to provide shared access to the memory objects in the shared address space; only one set of kernel and hardware resources are required.

Another feature is that multiple independent shared address spaces can be created and attached at any address within a task's address space.

The same concepts of the invention of the co-pending application Ser. No. 472,364 are herein applied to an Intel i386 architecture.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
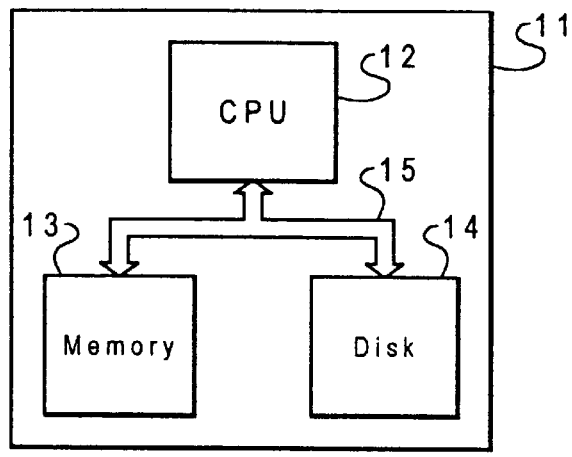
FIG. 1 is a high level block diagram of a data processing system which may use a virtual memory management system according to the invention.

With reference now to the figures and in particular with reference to FIG. 1, there is depicted a data processing system 11. Data processing system 11 includes a system central processing unit or CPU 12, a system memory 13, a mass storage controller 14 and a communications link 15 linking the CPU 12, memory 13 and mass storage controller 15 for interchange of data and commands. Communications link 15 may be a system bus or it may represent some type of network.

Figure 2:
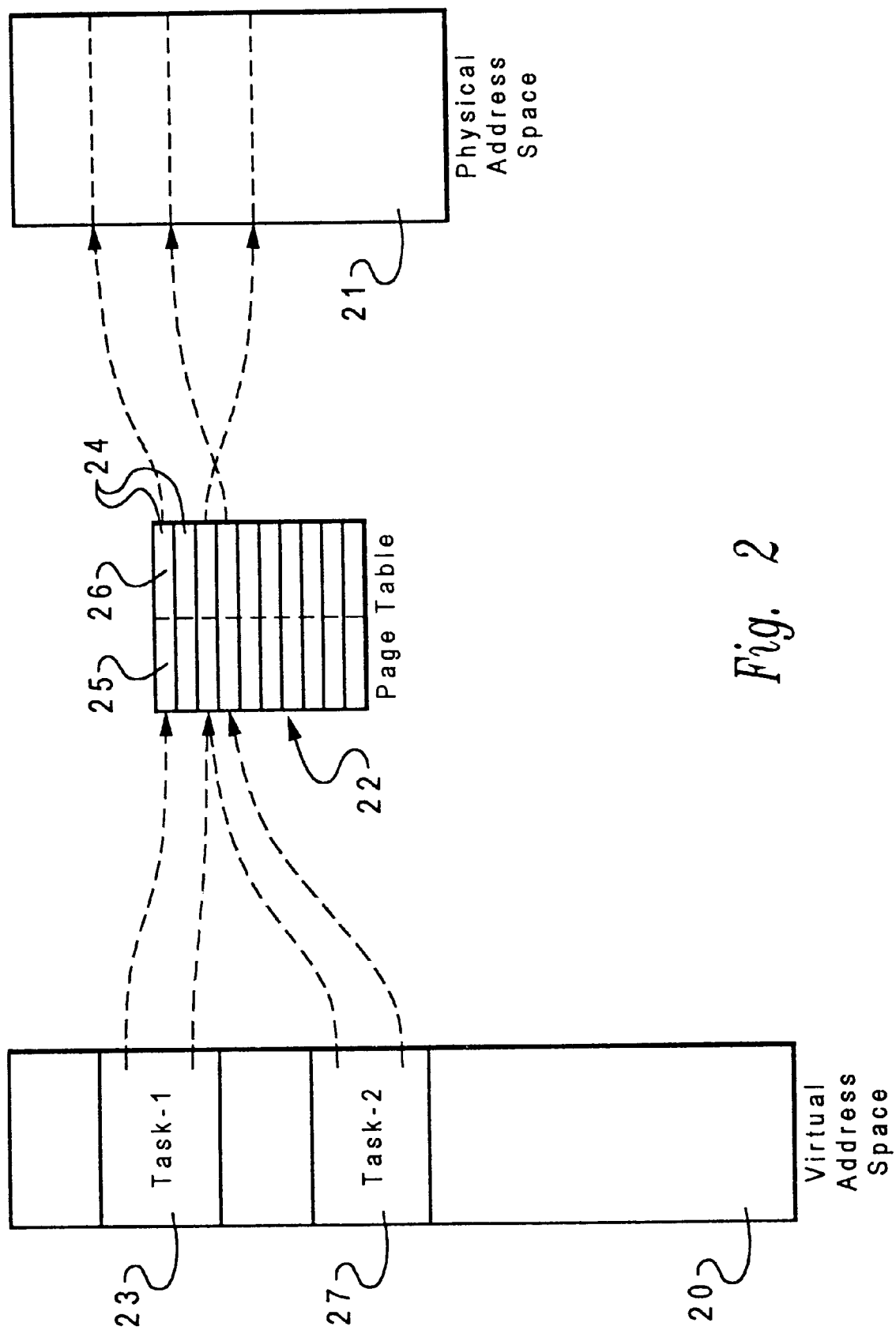
FIG. 2 is a map of virtual memory and physical memory for the system of FIG. 1, showing translation by a page table.

FIG. 2 is a map of virtual memory and physical memory for the system of FIG. 1. The virtual address space 20 is established by the type of microprocessor used in the CPU 12, such as a i486, a powerPC chip, or the like. Note that an i486, for example, exhibits only one 4-GB virtual address space, with a number of tasks using space within this 4-GB space, whereas a powerPC operating system sets up a separate 4-GB virtual address space for each task. The physical memory 13 is represented by a block 21, and is much smaller than the virtual address space. A page table 22, which is usually stored in memory 13, translates virtual addresses from space 20 to physical addresses in space 21. A Task-1 running on the CPU 12 may use a block 23 of the virtual address space, and individual virtual page addresses in block 23 are looked up in the page table 22 to find physical addresses. Each of the page table entries 24 contains a virtual address field 25 and a corresponding physical address field 26. The page table entry also contains protection information, and an indication of whether the page is in physical memory 13 or in disk storage 15 (in which case the page must be moved to physical memory before being used). A Task-2 running on the CPU 12 may use virtual memory block 27, and references entries 24 in the page table 22, and some of these entries may be the same as those for Task-1, i.e., the tasks may share physical memory; this is an example of page aliasing, in that a page in physical memory is used in both Task-1 and Task-2, but these locations have different virtual addresses so two page table entries 24 are used.

Figure 3:
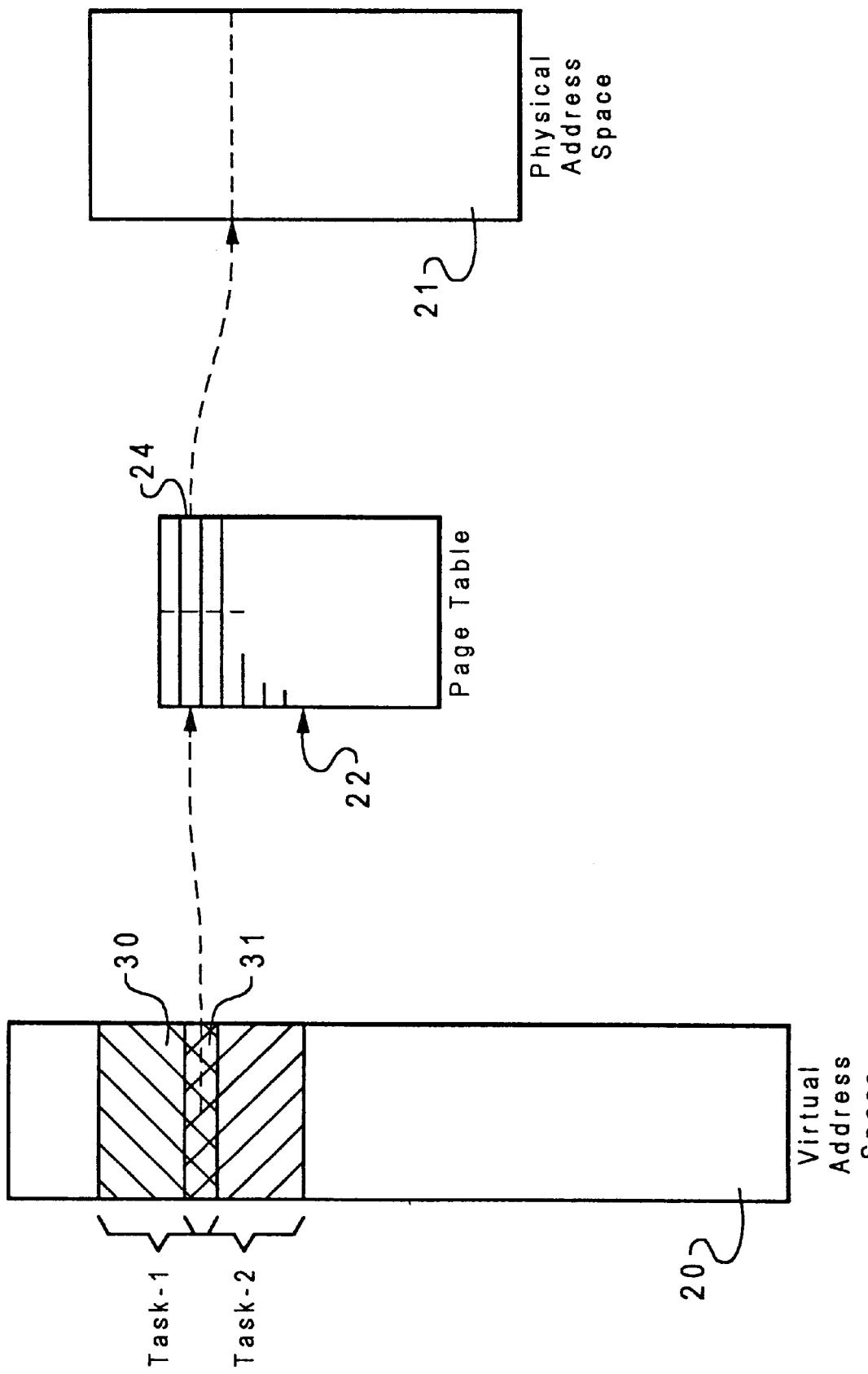
FIG. 3 is a map of virtual memory and physical memory for the system of FIG. 1, like FIG. 2, showing translation by a page table using a method of sharing memory.

FIG. 3 is also a map of virtual memory and physical memory, like FIG. 2, illustrating another method of sharing memory for the i486 type of architecture. Here Task-1 and Task-2 have an overlapping area 30, and some of the same virtual addresses appear in each task, so the same page table entries 24 are used for shared memory references, thus avoiding the duplication of page table entries. For example, a virtual memory location 31 in each task points to a particular entry 24 in the page table 22, which of course points to the same physical memory location. This is a very useful method, and may be accomplished according to the concepts of the invention, but still places constraints on the user, i.e., that shared address spaces for different tasks must have the same virtual addresses.

Figure 5:
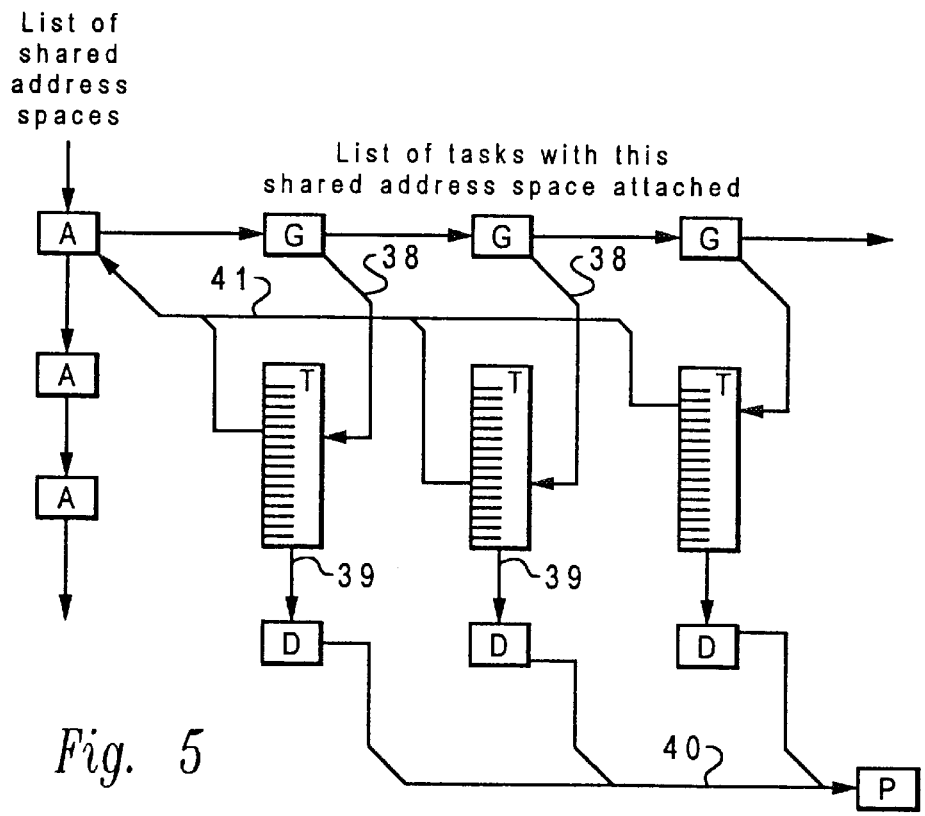
FIG. 5 is a diagram of a data structure organization used with the method of sharing memory of FIG. 4.
Figure 6:
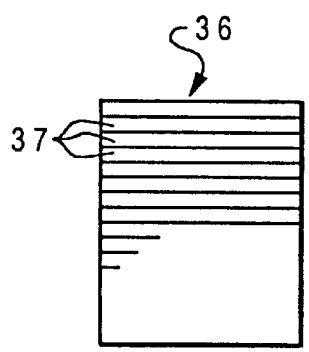
FIG. 6 is a data structure for the "T" structure of FIG. 5.

FIG. 4 is again a map of virtual memory and physical memory, like FIGS. 2 and 3 illustrating a method of sharing memory according to the invention. Here Task-1 and Task-2 have a shared memory location 32 or 33, which by another translator 34, point to the same entry 24 in the page table 22, and thus to the same location 35 in physical memory 21. In one example of an Intel i386 or i486, the translator 34 may be of the form shown in FIG. 5. Shared memory can be efficiently created on the IBM powerPC by mapping the same virtual segment ID into multiple address spaces, as described in co-pending application Ser. No. 472,364 filed herewith by William H. Schwartz & Suresh Yanamadala. FIG. 5 illustrates an efficient data structure organization to manage shared Intel page tables to emulate virtual segment IDs. Shared memory areas of 256 MB (28-bit addresses) can be created and mapped into an address space on 256 MB boundaries, as with powerPC virtual segment IDs. The diagram of FIG. 5 shows the data structure organization, i.e., a new data structure that is created by the OS in memory. For each shared memory area in virtual address space 20, a structure labelled "A" is created. All "A" structures are linked together, i.e., each data structure "A" contains the address of the next structure "A". For each location in virtual memory space 20 that a shared memory area is mapped into a task such as Task-1 or Task-2, a structure of type "G" is created and linked off its "A" structure; i.e., the structure "A" has within it the address of the first "G" and each "G" has the address of the next "G." Each "G" structure records the 256 MB slot that the shared memory was mapped into the task. Multiple "G" structures can point into the same task at different 256 MB offsets (28-bit addresses) into the virtual address space 20. Each task such as Task-1 or Task-2 has a sixteen-entry array 36 as seen in FIG. 6, with one entry 37 in the array for each 256 MB slot in the 32-bit (4-GB) virtual address space 20. An entry 37 points to the "A" structure if a shared memory area has been mapped into the task at that 256 MB slot. A "G" structure points via path 38 to an offset in a "T" structure which addresses a directory page "D" via a path 39.

Each task such as Task-1 or Task-2 has its own Intel directory page, and directory pages are labelled "D" in FIG. 5. The directory page entries in all directory pages "D" for a shared memory area "A" all point via path 40 to a common shared set of page tables "P," corresponding to page table 22 of FIG. 4.

Figure 4:
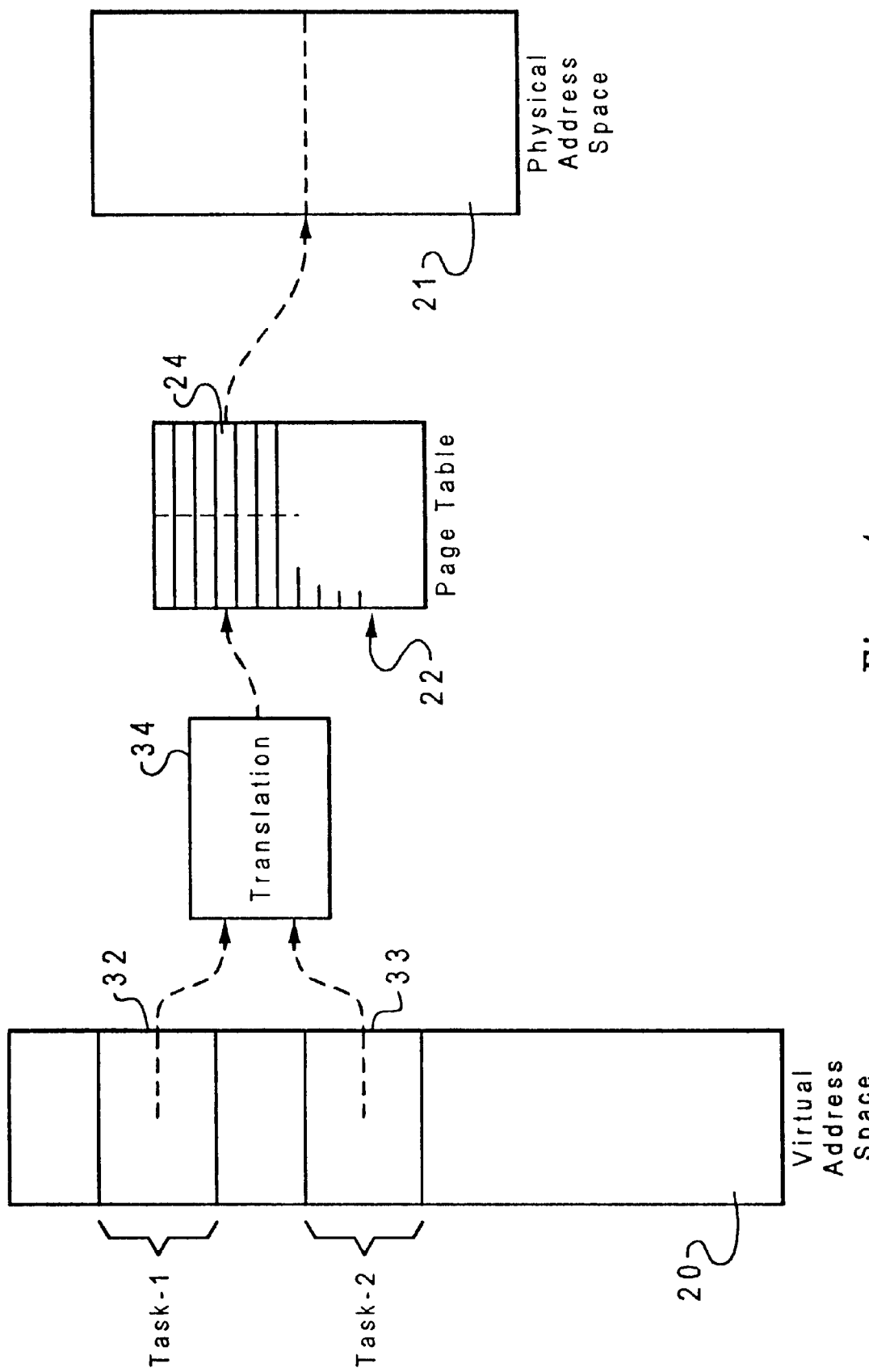
FIG. 4 is a map of virtual memory and physical memory for the system of FIG. 1, like FIGS. 2 and 3, showing translation by a page table using a method of sharing memory according to the invention described in co-pending application Ser. No. 472,364

With the organization of FIGS. 4 and 5, virtual memory operations that modify an existing page table entry only need modify the common page table entry in "P," i.e., a single entry 24 in page table 22. All tasks which have mapped the shared memory area will be affected by this change.

Virtual memory operations that modify the directory page "D" must modify all directory pages "D" which use the shared memory area. For example, adding a new virtual translation which requires a new page table to be allocated. In this case, the 16-entry array 36 of FIG. 6 is checked to see if this address is in a shared area. If not, the task's directory page can be modified. If the modification is to a shared area, then the entry in the "T" structure points via path 41 to the "A" structure for this shared area. The directory pages for all tasks in this shared memory's "G" list are modified.

Each virtual address has associated with it in the segment descriptors and the page table 21 various levels of memory protection in the Intel i386 or i486 architecture, and these can be used to allow control of whether each reference to a shared memory area can merely read from the shared locations, or can read and write the shared locations.

Figure 7:
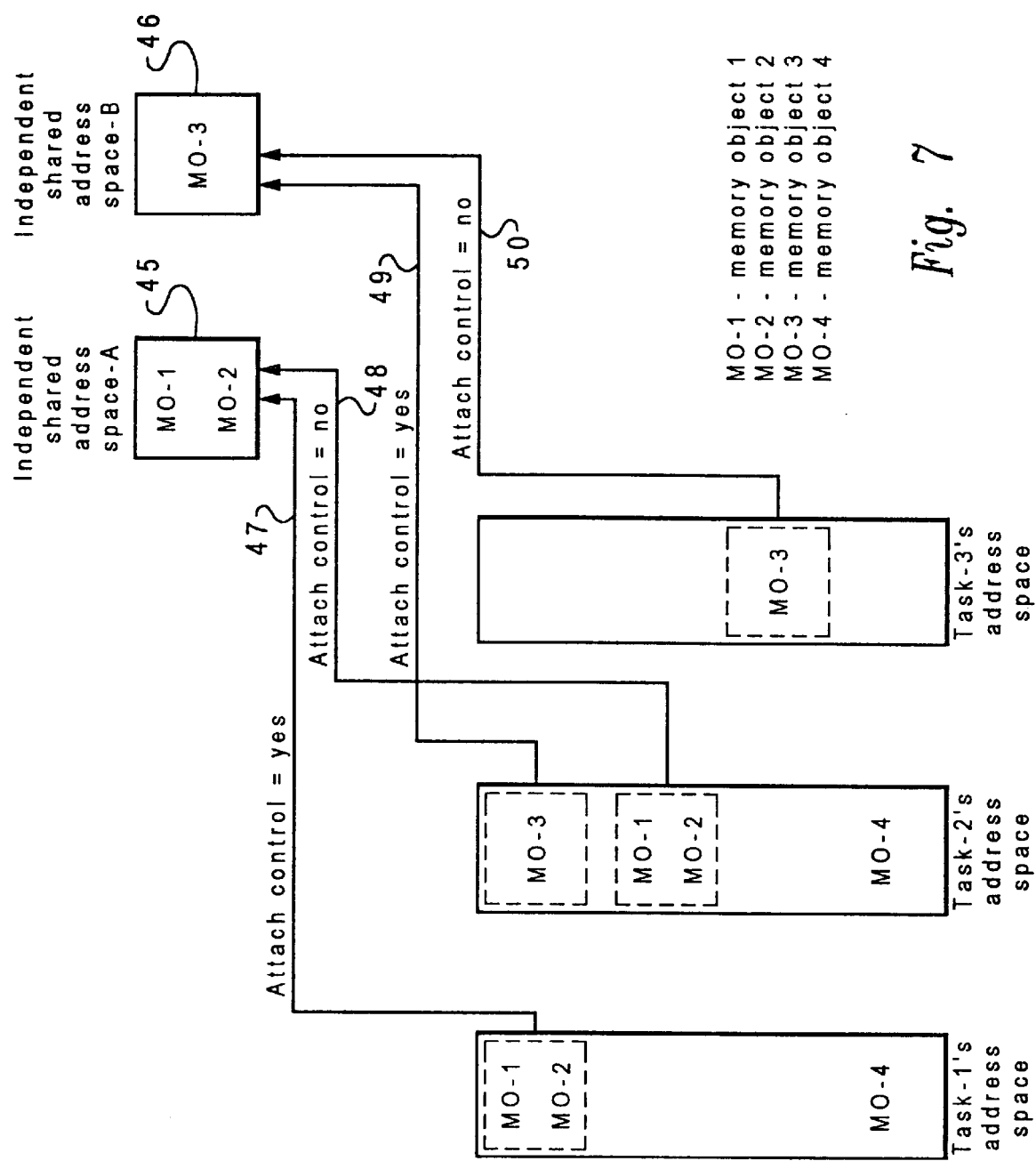
FIG. 7 is a diagram like a memory map showing an example of how tasks can share memory spaces in the invention of FIG. 4.

The shared memory method as described in co-pending application Ser. No. 472,364 that is to be emulated by the method of this invention, but using an Intel i386 or i486 in this case, is illustrated schematically in the diagram of FIG. 7. Again, note that the microkernel operating system for the powerPC sets up independent virtual address spaces for each task, rather than having tasks share a continuous 4-GB 32-bit address space as in the i486 type of architecture. This diagram of FIG. 7 shows three tasks, Task-1, Task-2, and Task-3, and two independent shared address spaces 45 and 46, called Space-A and Space-B. Also shown are memory objects MO-1, MO-2, MO-3, and MO-4. Task-1 has shared address 45, Space-A, attached to its address space with a control=yes, represented by path 47. This enables Task-1 to add and destroy memory objects in shared address Space-A by manipulating its own address space in the range of addresses where shared address Space-A is attached. Task-2 has shared address Space-A attached with control=no, represented by path 48. Task-2 can reference the memory objects contained in shared address Space-A, but cannot add or destroy memory objects in this range of address in its address space. Task-1 has the identical access rights to the memory objects contained in shared address Space-A.

Task-2 of FIG. 7 has shared address Space-B attached with control=yes, represented by path 49, allowing Task-2 to manipulate shared address Space-B. Task-3 has shared address Space-B attached with control=no, represented by path 50. Task-3 can only reference the memory objects in shared address Space-B.

Resources are conserved since users of the shared address spaces share a single instance of kernel structures and hardware resources needed to manage the memory objects in each shared address space. Page aliasing, as illustrated by Task-1 and Task-2 both having access to memory object MO-4 of FIG. 7, requires replicated resources (such as page table entries 24 in page table 22) in each task since these resources are not being shared. Unlike allocating a new memory object in the shared address space which will show up everywhere the shared address space is attached in one operation, allocating a new memory object with page aliasing requires an operation to be performed in each address space that it should be seen.

Task-1 has no access to shared address Space-B of FIG. 7. Likewise, Task-3 has no access to shared memory address Space-A or other memory objects contained in shared address Space-A. Task-2 has access to memory objects in both shared address spaces.

It would be possible to attach different shared address spaces at the same address in different task's address spaces, enabling the tasks to reference different memory objects at a common address.

A typical use of shared address spaces would be to place shared system resources, such as shared libraries and global data in a share address space and attach the shared address space with control=no into user tasks at the same virtual address. The system loader would have an attachment of the shared address space with control=yes to enable new libraries to be loaded. User tasks with a different pervasive personality could be attached to a different shared address space.

In the IBM microkernel operating system for the powerPC, as described in co-pending application Ser. No. 472,364, a particular interface or data structure is provided for setting up the shared memory organization as described above. A so-called host_shared_memory_create function creates a virtual address space, where the size is a multiple of the machine-dependent segment size; in an Intel i386 or i486 the segment size can be any size up to 4-GB. This function specifies the port for the host machine, and also a kernel-assigned port name for the virtual address space, called vm_space_port, and this is used as a token for accessing the virtual address space created and all other calls to this port fail. Then, a virtual_shared_memory_attach function provides access to the virtual address space, as by a task; this function maps the virtual address space into a given address range. The range can be set to be either inherited by child tasks with an inherit parameter. The range can be set to either have or not have control over the virtual address space as discussed above, i.e., control=yes or control=no. This virtual_shared_memory_attach function specifies a value called target_space which is the port of the virtual memory address space in which the virtual address space is to be mapped, and specifies a value base_addr which is the address where the virtual address space is to be mapped, and this must be a machine-dependent segment boundary. The virtual_shared_memory_attach function also specifies a "size" value which is the size of the virtual address space to be mapped, and a value called vm_space_port which is the port returned by the host_shared_memory_create function, and also has an inheritance indicator called "inherit" which may be true or false, as well as a control indication which is =yes or =no. Similarly, a virtual_shared_memory_detach function deallocates a virtual address space mapping from a given virtual address space associated with a task. The range for which the shared memory was mapped can be left reserved on request; otherwise it will be empty. This virtual_shared_memory_detach function specifies parameters just as the virtual_shared_memory_attach function (except it doesn't have inherit and control), and also specifies a value called "reserve" which is the reserve indicator, true or false.

While the invention has been particularly shown and described with reference to a preferred embodiment, it will be understood by those skilled in the art that various changes in form and detail may be made therein without departing from the spirit and scope of the invention.

What is claimed is:

1. A method of sharing virtual address space by a plurality of tasks in a computer memory management system, said computer memory management system including, for each of said plurality of tasks, an offset table of directory pages, wherein each entry in each said offset table of directory pages references a directory page, said method comprising the steps of:

selectively mapping an independent address space into an address space of more than one of said plurality of tasks;

maintaining a list of independent address spaces within said virtual address space which are shared by more than one of said plurality of tasks;

maintaining a list of locations in virtual address space, wherein each entry in said list of locations references an entry in one of said offset tables of directory pages and corresponds to an instance that said independent address space was mapped into an address space of one of said plurality of tasks;

maintaining each said offset table of directory pages, such that all entries in each said offset table corresponding to said independent address space reference an entry in said list of independent address spaces;

maintaining each said directory page such that all entries in each said directory page corresponding to said independent address space reference a common set of page tables; and translating a virtual address within said independent address space generated by one of said plurality of tasks to a physical address utilizing said list of independent address spaces, said list of locations in virtual address space, and an offset table of directory pages wherein said mapping step further comprises the step of selectively mapping said independent address space, at a plurality of different locations, into an address space of one of said more than one of said plurality of tasks.

2. A method as set forth in claim 1, wherein said list of independent address spaces is a linked list.

3. A method as set forth in claim 1, wherein said list of locations is a linked list.

4. A method as set forth in claim 1, further comprising the step of:

for at least one of said independent address spaces, altering a memory access characteristic of said at least one of said independent address spaces by altering an entry in said common set of page tables.

5. A computer system including a virtual address space, a plurality of tasks, and a computer memory management system, said computer memory management system including, for each of said plurality of tasks, an offset table of directory pages, wherein each entry in each said offset table of directory pages references a directory page, comprising:

means for selectively mapping an independent address space into an address space of more than one of said plurality of tasks;

means for maintaining a list of independent address spaces within said virtual address space which are shared by more than one of said plurality of tasks;

means for maintaining a list of locations in virtual address space, wherein each entry in said list of locations references an entry in one of said offset tables of directory pages and corresponds to an instance that said independent address space was mapped into an address space of one of said plurality of tasks;

means for maintaining each said offset table of directory pages, such that all entries in each said offset table corresponding to said independent address space reference an entry in said list of independent address spaces;

means for maintaining each said directory page such that all entries in each said directory page corresponding to said independent address space reference a common set of page tables; and means for translating a virtual address within said independent address space generated by one of said plurality of tasks to a physical address utilizing said list of independent address spaces, said list of locations in virtual address space, and an offset table of directory pages wherein said mapping means further comprises means for selectively mapping said independent address space, at a plurality of different locations, into an address space of one of said more than one of said plurality of tasks.

6. A system as set forth in claim 5, wherein said list of independent address spaces is a linked list.

7. A system as set forth in claim 5, wherein said list of locations is a linked list.

8. A system as set forth in claim 5, further comprising:

for at least one of said independent address spaces, means for altering a memory access characteristic of said at least one of said independent address spaces by altering an entry in said common set of page tables.

* * * * *